US 8,743,901 B2

(12) United States Patent
Rahman

(10) Patent No.: US 8,743,901 B2
(45) Date of Patent: Jun. 3, 2014

(54) REMOTING OF USER/CALLEE PRESENCE INFORMATION IN A UPNP NETWORK

(75) Inventor: Mahfuzur Rahman, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 552 days.

(21) Appl. No.: 12/425,156

(22) Filed: Apr. 16, 2009

(65) Prior Publication Data

US 2010/0208746 A1    Aug. 19, 2010

Related U.S. Application Data

(60) Provisional application No. 61/152,429, filed on Feb. 13, 2009.

(51) Int. Cl.
*H04J 3/00* (2006.01)
*H04L 12/28* (2006.01)

(52) U.S. Cl.
CPC .................... *H04L 12/2803* (2013.01)
USPC ........................................................ 370/464

(58) Field of Classification Search
CPC .................................. H04L 12/2803
USPC ........................................................ 370/464
See application file for complete search history.

(56) References Cited

U.S. PATENT DOCUMENTS

| 7,573,498 | B1 * | 8/2009 | Dhanoa et al. | 348/14.04 |
| 2006/0155851 | A1 * | 7/2006 | Ma et al. | 709/226 |
| 2007/0286100 | A1 * | 12/2007 | Saaranen et al. | 370/260 |
| 2009/0024601 | A1 * | 1/2009 | Zmolek | 707/4 |
| 2009/0144426 | A1 * | 6/2009 | Gao et al. | 709/226 |
| 2009/0193069 | A1 * | 7/2009 | Alexander et al. | 709/203 |
| 2009/0300158 | A1 | 12/2009 | Bobde et al. | |
| 2009/0304019 | A1 * | 12/2009 | Chan | 370/432 |
| 2010/0075673 | A1 * | 3/2010 | Colbert et al. | 455/435.1 |
| 2010/0223328 | A1 * | 9/2010 | Haataja et al. | 709/203 |
| 2010/0241748 | A1 * | 9/2010 | Ansari et al. | 709/225 |
| 2010/0269169 | A1 * | 10/2010 | Huang | 726/12 |
| 2010/0293299 | A1 * | 11/2010 | Stokking et al. | 709/249 |
| 2011/0110271 | A1 * | 5/2011 | Arauz-Rosado | 370/255 |
| 2011/0185006 | A1 * | 7/2011 | Raghav et al. | 709/201 |
| 2011/0212773 | A1 * | 9/2011 | Hjelm et al. | 463/29 |

OTHER PUBLICATIONS

Kumar et al. Mobility Support for Universal Plug and Play Devices Using Session Initiation Protocol, 2005, IEEE, pp. 788-792.*
Mark R. Walker, PhD, "CEA 2014 Overview", ATIS ITU-T FG IPTV Interoperability Forum, Mountain View, CA, Jan. 24, 2007—10 pages.

* cited by examiner

*Primary Examiner* — Mark Rinehart
*Assistant Examiner* — Christopher R Crompton
(74) *Attorney, Agent, or Firm* — Kenneth L. Sherman, Esq.; Michael Zarrabian, Esq.; Sherman & Zarrabian LLP

(57) ABSTRACT

In a first embodiment of the present invention, a method for remoting user/callee presence information in a home network is provided, the method comprising: subscribing, from a home network presence client, to one or more home network presence servers, for presence information relating to one or more users; receiving, from one of the home network presence servers, a change in presence information relating to one of said one or more users; and notifying a user of a device associated with the home network presence client of the change in presence information.

19 Claims, 9 Drawing Sheets

REMOTING OF USER/CALLEE PRESENCE INFORMATION IN A UPNP NETWORK

CROSS REFERENCE TO RELATED APPLICATIONS

This patent application claims priority to U.S. Provisional Patent Application No. 61/152,429, filed on Feb. 13, 2009 entitled "ENABLING REMOTING OF USER/CALLEE AVAILABILITY INFORMATION IN A UPNP NETWORK", by Mahfuzur RAHMAN, which is incorporated by reference in its entirety for all purposes.

BACKGROUND OF THE INVENTION

1. Field of the Invention

The present invention relates generally to home networking. More specifically, the present invention relates to the remoting of user/callee presence information in a UPnP network.

2. Description of the Related Art

Home networking has advanced from the early days of merely linking computers and printers to the modern home network, which can include mobile devices, televisions, set-top boxes, refrigerators, etc.

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., iPod, television set, etc.).

Voice over Internet Protocol (VoIP) is a general term for a family of transmission technologies for delivery of voice communications over the Internet or other packet-switched networks. Other terms frequently encountered and synonymous with VoIP are IP telephony and Internet telephony, as well as voice over broadband, broadband telephony, and broadband phone, when the network connectivity is available over broadband Internet access.

VoIP systems usually interface with the traditional public switched telephone network (PSTN) to allow for transparent phone communications worldwide.

VoIP can be a benefit for reducing communication and infrastructure costs by routing phone calls over existing data networks and avoiding duplicate network systems. Skype and Vonage are notable service provider examples that have achieved widespread user and customer acceptance and market penetration.

Voice-over-IP systems carry telephony speech as digital audio, typically reduced in data rate using speech data compression techniques, packetized in small units of typically tens of milliseconds of speech, and encapsulated in a packet stream over IP.

The Session Initiation Protocol (SIP) is a VoIP signaling protocol, widely used for setting up and tearing down multimedia communication sessions such as voice and video calls over the Internet. The protocol can be used for creating, modifying and terminating two-party (unicast) or multiparty (multicast) sessions consisting of one or several media streams. The modification can involve changing addresses or ports, inviting more participants, adding or deleting media streams, etc.

SIP clients typically use TCP or UDP (typically on port 5060 and/or 5061) to connect to SIP servers and other SIP endpoints. SIP is primarily used in setting up and tearing down voice or video calls.

A motivating goal for SIP was to provide a signaling and call setup protocol for IP-based communications that can support a superset of the call processing functions and features present in the public switched telephone network (PSTN). SIP by itself does not define these features; rather, its focus is call-setup and signaling. However, it was designed to enable the construction of functionalities of network elements designated Proxy Servers and User Agents. These are features that permit familiar telephone-like operations: dialing a number, causing a phone to ring, hearing ringback tones or a busy signal. Implementation and terminology are different in the SIP world but to the end-user, the behavior is similar.

SIP-enabled telephony networks can also implement many of the more advanced call processing features present in Signaling System 7 (SS7), though the two protocols themselves are very different. SS7 is a centralized protocol, characterized by a complex central network architecture and dumb endpoints (traditional telephone handsets). SIP is a peer-to-peer protocol, thus it requires only a simple (and thus scalable) core network with intelligence distributed to the network edge, embedded in endpoints (terminating devices built in either hardware or software). SIP features are implemented in the communicating endpoints (i.e. at the edge of the network) contrary to traditional SS7 features, which are implemented in the network.

Recently, VoIP has been extended to mobile devices such as cellular phones. There are several methodologies by which a mobile handset can be integrated into a VoIP network. One implementation turns the mobile device into a standard SIP client, which then uses a data network to send and receive SIP messaging, and to send and receive RTP for the voice path. This methodology of turning a mobile handset into a standard SIP client requires that the mobile handset support, at minimum, high speed IP communications. In this application, standard VoIP protocols (typically SIP) can be used over any broadband IP-capable wireless network connection.

Another implementation of mobile integration uses a softswitch like gateway to bridge SIP and RTP into the mobile network's SS7 infrastructure. In this implementation, the mobile handset continues to operate as it always has (as a GSM or CDMA based device), but now it can be controlled by a SIP application server which can now provide advanced SIP based services to it. Several vendors offer this kind of capability today.

Mobile VoIP will require a compromise between economy and mobility. For example, Voice over Wi-Fi offers potentially free service but is only available within the coverage area of a Wi-Fi Access Point. High speed services from mobile operators may have better audio quality and capabilities for metropolitan-wide coverage including fast handoffs among mobile base stations, yet it will cost more than the typical Wi-Fi-based VoIP service.

Mobile VoIP will become an important service in the coming years as device manufacturers exploit more powerful processors and less costly memory to meet user needs for ever-more "power in their pocket". Smartphones are capable of sending and receiving email, browsing the web and in some cases allowing a user to watch TV.

As UPnP grows in popularity, more and more devices in the home are going to be networked. One particularly attractive notion is to integrate a digital television set into a UPnP network to allow users to access network functions through their television.

SUMMARY OF THE INVENTION

In a first embodiment of the present invention, a method for remoting user/callee presence information in a home network is provided, the method comprising: subscribing, from a home network presence client, to one or more home network presence servers, for presence information relating to one or more users; receiving, from one of the home network presence servers, a change in presence information relating to one of said one or more users; and notifying a user of a device associated with the home network presence client of the change in presence information.

In a second embodiment of the present invention, another method for remoting user/callee availability information in a home network is provided, the method comprising: invoking, at a home network presence client, a Universal Plug and Play (UPnP) action requesting presence information, from a home network presence server, relating to one or more users; receiving, from the home network presence server, presence information relating to one of said one or more users; and notifying a user of a device associated with the home network presence client of the presence information regarding the one of said one or more users.

In a third embodiment of the present invention, another method for remoting user/callee presence information in a home network is provided, the method comprising: receiving a subscription from a home network presence client for presence information relating to one or more users; detecting a change in presence information relating to one of the one or more users; and transmitting the change in presence information related to the one or more users to the home network presence client.

In a fourth embodiment of the present invention, another method for remoting user/callee presence information in a home network is provided, the method comprising: receiving, from a home network presence client, a request for presence information relating to one or more users, the request generated by invocation of a UPnP action; and transmitting presence information related to the one or more users to the home network presence client.

In a fifth embodiment of the present invention, another method for remoting user/callee presence information in a home network is provided, the method comprising: subscribing, from a home network presence client, to a home network presence aggregation server, for presence information relating to one or more users; receiving, from the home network presence aggregation server, a change in presence information relating to one of the one or more users, wherein the change was detected by one or more home network presence servers and communicated to the home network presence aggregation server; and notifying a user of a device associated with the home network presence client of the change in presence information.

In a sixth embodiment of the present invention, another method for remoting user/callee presence information in a home network is provided, the method comprising: invoking, at a home network presence client, a Universal Plug and Play (UPnP) action requesting presence information, from a home network presence aggregation server, relating to one or more users; receiving, from the home network presence aggregation server, presence information relating to one of the one or more users, wherein the presence information was sent by one or more home network presence servers to the home network presence aggregation server; and notifying a user of a device associated with the home network presence client of the change in presence information.

In a seventh embodiment of the present invention, another method for remoting user/callee presence information in a home network is provided, the method comprising: receiving a subscription from a home network presence aggregation server for presence information relating to one or more users; detecting a change in presence information relating to one of the one or more users; and transmitting the change in presence information related to the one of the one or more users to the home network presence aggregation server for distribution to the home network presence client.

In a eighth embodiment of the present invention, an apparatus is provided comprising: a memory; a processor; and a home network presence client configured to: subscribe, from a home network presence client, to one or more home network presence servers, for presence information relating to one or more users; receive, from one of the home network presence servers, a change in presence information relating to one of said one or more users; and notify a user of a device associated with the home network presence client of the change in presence information.

In a ninth embodiment of the present invention, another apparatus is provided comprising: a memory; a processor; and a home network presence client configured to: invoke, at a home network presence client, a Universal Plug and Play (UPnP) action requesting presence information, from a home network presence server, relating to one or more users; receive, from the home network presence server, presence information relating to one of said one or more users; and notify a user of a device associated with the home network presence client of the presence information regarding the one of said one or more users.

In a tenth embodiment of the present invention, another apparatus is provided comprising: a memory; a processor; and a home network presence server configured to: receive a subscription from a home network presence client for presence information relating to one or more users; detect a change in presence information relating to one of the one or more users; and transmit the change in presence information related to the one or more users to the home network presence client.

In a eleventh embodiment of the present invention, another apparatus is provided comprising: a memory; a processor; and a home network presence server configured to: receive, from a home network presence client, a request for presence information relating to one or more users, the request generated by invocation of a UPnP action; and transmit presence information related to the one or more users to the home network presence client.

In a twelfth embodiment of the present invention, another apparatus is provided comprising: a memory; a processor; and a home network presence client configured to: subscribe, from a home network presence client, to a home network presence aggregation server, for presence information relating to one or more users; receive, from the home network presence aggregation server, a change in presence information relating to one of the one or more users, wherein the change was detected by one or more home network presence servers and communicated to the home network presence aggregation server; and notify a user of a device associated with the home network presence client of the change in presence information.

In a thirteenth embodiment of the present invention, another apparatus is provided comprising: a memory; a processor; and a home network presence client configured to: invoke, at a home network presence client, a Universal Plug and Play (UPnP) action requesting presence information, from a home network presence aggregation server, relating to one or more users; receive, from the home network presence aggregation server, presence information relating to one of the one or more users, wherein the presence information was sent by one or more home network presence servers to the home network presence aggregation server; and notify a user of a device associated with the home network presence client of the change in presence information.

In a fourteenth embodiment of the present invention, another apparatus is provided comprising: a memory; a processor; and a home network presence aggregation server configured to: receive a subscription from a home network presence aggregation server for presence information relating to one or more users; detect a change in presence information relating to one of the one or more users; and transmit the change in presence information related to the one of the one or more users to the home network presence aggregation server for distribution to the home network presence client.

In a fifteenth embodiment of the present invention, an apparatus for remoting user/callee presence information in a home network is provided, the apparatus comprising: means for subscribing, from a home network presence client, to one or more home network presence servers, for presence information relating to one or more users; means for receiving, from one of the home network presence servers, a change in presence information relating to one of said one or more users; and means for notifying a user of a device associated with the home network presence client of the change in presence information.

In a sixteenth embodiment of the present invention, another apparatus for remoting user/callee availability information in a home network is provided, the apparatus comprising: means for invoking, at a home network presence client, a Universal Plug and Play (UPnP) action requesting presence information, from a home network presence server, relating to one or more users; means for receiving, from the home network presence server, presence information relating to one of said one or more users; and means for notifying a user of a device associated with the home network presence client of the presence information regarding the one of said one or more users.

In a seventeenth embodiment of the present invention, another apparatus for remoting user/callee presence information in a home network is provided, the apparatus comprising: means for receiving a subscription from a home network presence client for presence information relating to one or more users; means for detecting a change in presence information relating to one of the one or more users; and means for transmitting the change in presence information related to the one or more users to the home network presence client.

In a eighteenth embodiment of the present invention, another apparatus for remoting user/callee presence information in a home network is provided, the apparatus comprising: means for receiving, from a home network presence client, a request for presence information relating to one or more users, the request generated by invocation of a UPnP action; and means for transmitting presence information related to the one or more users to the home network presence client.

In a nineteenth embodiment of the present invention, another apparatus for remoting user/callee presence information in a home network is provided, the apparatus comprising: means for subscribing, from a home network presence client, to a home network presence aggregation server, for presence information relating to one or more users; means for receiving, from the home network presence aggregation server, a change in presence information relating to one of the one or more users, wherein the change was detected by one or more home network presence servers and communicated to the home network presence aggregation server; and means for notifying a user of a device associated with the home network presence client of the change in presence information.

In a twentieth embodiment of the present invention, another apparatus for remoting user/callee presence information in a home network is provided, the apparatus comprising: means for invoking, at a home network presence client, a Universal Plug and Play (UPnP) action requesting presence information, from a home network presence aggregation server, relating to one or more users; means for receiving, from the home network presence aggregation server, presence information relating to one of the one or more users, wherein the presence information was sent by one or more home network presence servers to the home network presence aggregation server; and means for notifying a user of a device associated with the home network presence client of the change in presence information.

In a twenty-first embodiment of the present invention, another apparatus for remoting user/callee presence information in a home network is provided, the apparatus comprising: means for receiving a subscription from a home network presence aggregation server for presence information relating to one or more users; means for detecting a change in presence information relating to one of the one or more users; and means for transmitting the change in presence information related to the one of the one or more users to the home network presence aggregation server for distribution to the home network presence client.

DETAILED DESCRIPTION OF SPECIFIC EMBODIMENTS

Figure 1:
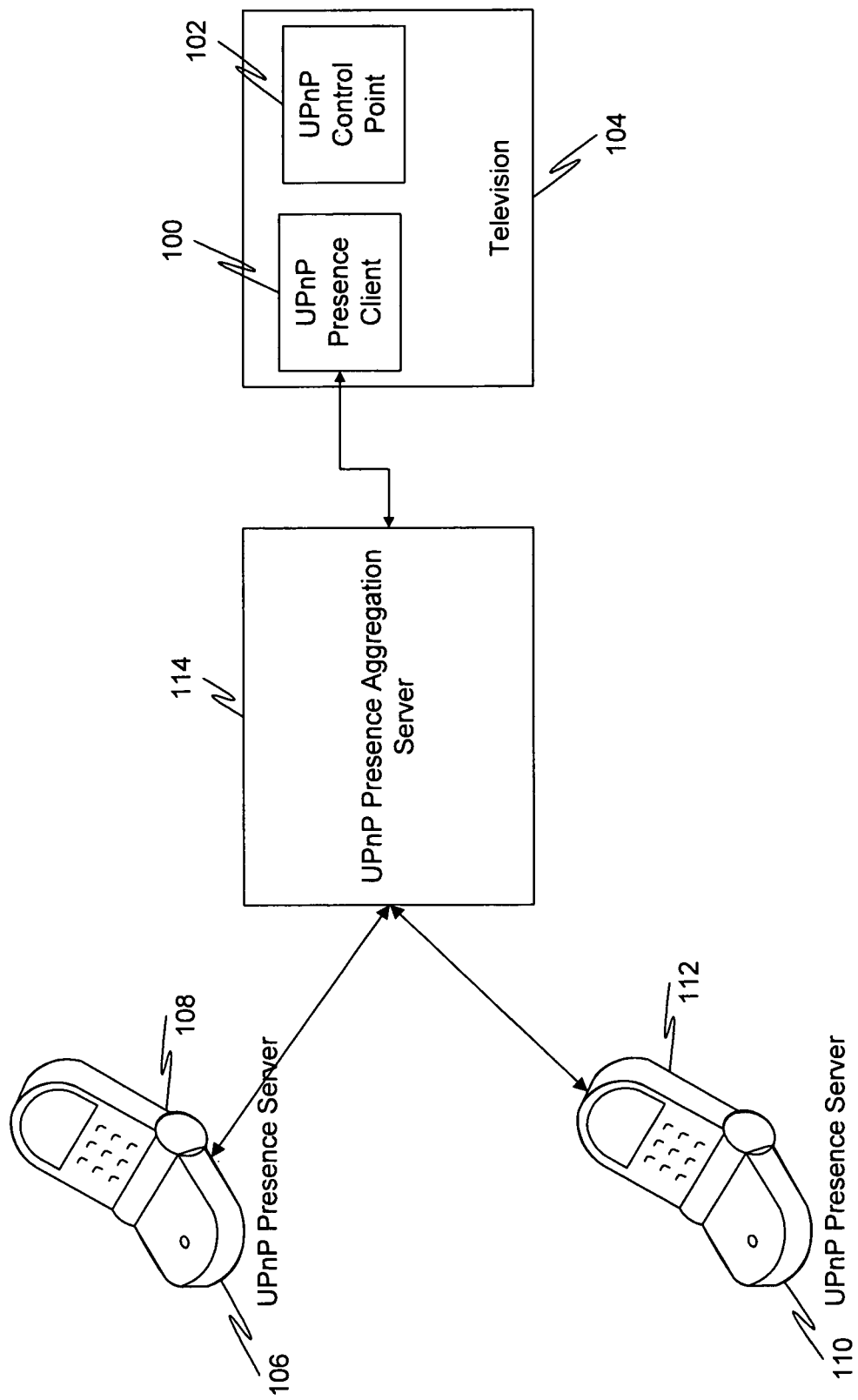
FIG. 1 is a diagram illustrating a system for providing the remoting of user/callee presence information in a UPnP network in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

It should be noted that the term "home networking" as used throughout this document refers to a type of network that is commonly used in homes to connect media devices. There is no requirement, however, that this type of networking actually be used in homes, as it has equal applicability for use in businesses or other entities. As such, the term "home networking" shall not be construed as limiting any embodiments of the present invention to use in a home, and shall be interpreted as any type of local area network (LAN).

The inventors of the present invention recognized that, as part of extending VoIP services from a cell phone to another device in a home network, such as a digital television, it would be beneficial if user/callee presence information could also be made available to the device. Presence information includes a wide range of metadata regarding a user, such as the user's availability, location of the user (geographical or relative), device the user is using, capability of the device, etc. Availability information indicates the ability of the user to accept or reject a call or participate in an instant messaging or SMS/MMS session.

Presence information regarding users that are operating outside of a home network is made available to users inside the home network via a presence server. The presence server may be a software element that can be part of a UPnP telephony server. The presence server gathers presence information from different sources, including SIP/IMS networks, instant messaging networks, etc. This presence information may then be retrieved from the presence server by a presence client located on a user device, such as a cell phone.

Presence information may be kept by the presence server per individual contact/user in its database. When sending out notifications to a client the presence server is able to filter out presence changes for this particular user/contact from all other users/contacts, thus sending only presence status relating to this particular user as notification.

In an embodiment of the present invention, presence information is transmitted from the cell phone to the other UPnP device such as a digital television. The presence information may include availability information (i.e., information regarding whether certain users/callees are available at the moment). This allows a user to figure out whether his contacts, such as friends, family members, colleagues, etc., are busy, available to engage in a telephony call, or available to engage in a messaging session. For example, SIP provides for the ability to determine in real time whether a "buddy" in the cell phone user's frequent contacts list is available (e.g., cell phone is online and connected to the network, or available for text messaging, etc). This presence information is then pushed from the cell phone to the digital television using the RUI. This allows, for example the user to see a list of friends who are available to receive a call or text message prior to initiating a call to one of the friends.

The user/callee presence information can be gathered from, for example, an IP Multimedia Subsystem (IMS) based system by subscribing to the presence/presence information of the user based on the SIP address of the user/callee. Despite the term "callee" being used throughout this document, the user presence refers not only to telephony calls but also for the presence of the user to engage in other tasks, such as an instant messaging session. The control point can gather the user's presence for instant messaging by monitoring the user's status on a particular instant messaging system such as Yahoo, AOL, MSN, etc. The aggregation of all presence information can be achieved by a control point (located, for example, on the device, such as a television) subscribing to all presence services residing in the UPnP network and receiving notifications of the statuses of the users/callees.

FIG. 1 is a diagram illustrating a system for providing the remoting of user/callee presence information in a UPnP network in accordance with an embodiment of the present invention. A UPnP presence client 100 and control point 102 may be located in a UPnP device 104, such as television. A first UPnP Presence Server 106 may be located on a first cell phone 108. A second UPnP Presence Server 110 may be located on a second cell phone 112. The UPnP presence servers 106, 110 are responsible for gathering callee/user presence information. For example, a cell phone using an IMS system will gather presence of callee/user information by subscribing to the presence information of the user/callee using the SIP URL of the user/callee. In the case of presence of a user to engage in an instant messaging session, such information can be gathered by running messaging clients for existing messaging service provided by the cell phones.

In an embodiment of the present invention, a state variable is defined by the UPnP Presence server that provides the following information for a user:

a. User/Callee availability (e.g., Offline or Online)
   b. User/Callee Location (e.g., geographic location)
   c. User/Callee's phone capability (e.g., video call-capable)

An example schema for the above-described state variable is:

```
<?xml version="1.0"?>
<Presence>
    xmlns="urn:schemas-upnp-org:cs"
    xmlns:xsd="http://www.w3.org/2001/XMLSchema"
    xmlns:xsi="http://www.w3.org/2001/XMLSchema-instance"
    xsi:schemaLocation="urn:schemas-upnp-org:presence
    http://www.upnp.org/schemas/availabilty/
    presence-v1-20070XXXX.xsd">
    <Status>Represent User's Status</Status>
```

-continued

```
<Location>User/Callee's Location</Location>
<Capability>Capability for the phone of the callee</Capability>
</Presence>
```

It should be noted that embodiments are envisioned wherein additional presence information, such as device information, is also supported. Nothing in the above section shall be construed as limiting the presence information to particular types.

A UPnP Presence Aggregation Server 114 can be used as an intermediary between the UPnP Presence Client 100 and the UPnP Presence Servers 106, 110. It may receive notification of presence changes from the Presence Servers 106, 110 and then aggregate the information. This may include calling a SOAP action to retrieve presence as required. The UPnP Presence Aggregation Server 116 can be located on any device, but in one embodiment of the present invention it is located on the UPnP device (e.g., television).

Figure 2:
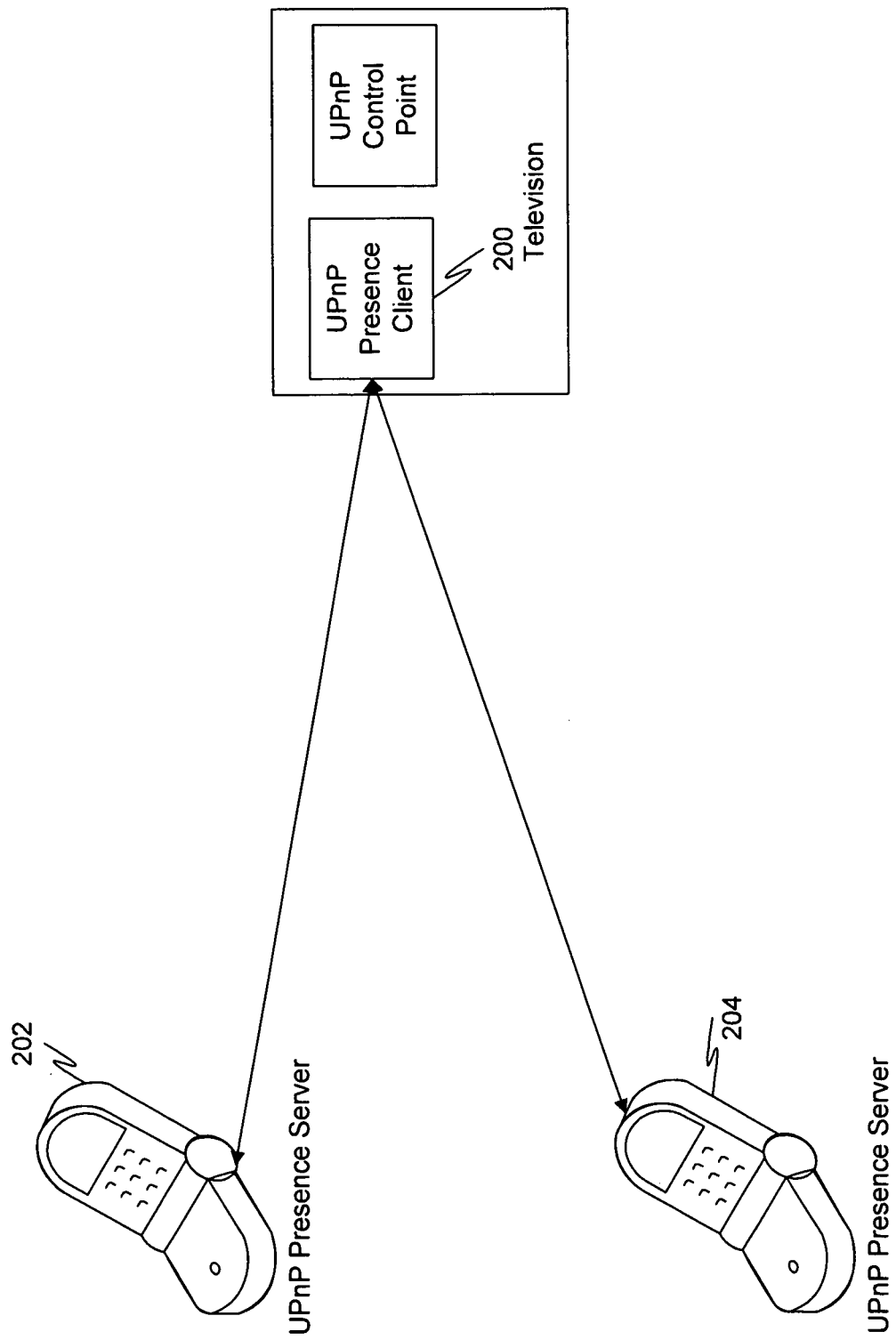
FIG. 2 is a diagram illustrating a system for providing the remoting of user/callee presence information in a UPnP network in accordance with another embodiment of the present invention.

FIG. 2 is a diagram illustrating a system for providing the remoting of user/callee presence information in a UPnP network in accordance with another embodiment of the present invention. Here, no presence aggregation server is utilized and instead the UPnP Presence client 200 communicates directly with each UPnP Presence Server 202, 204.

Figure 3:
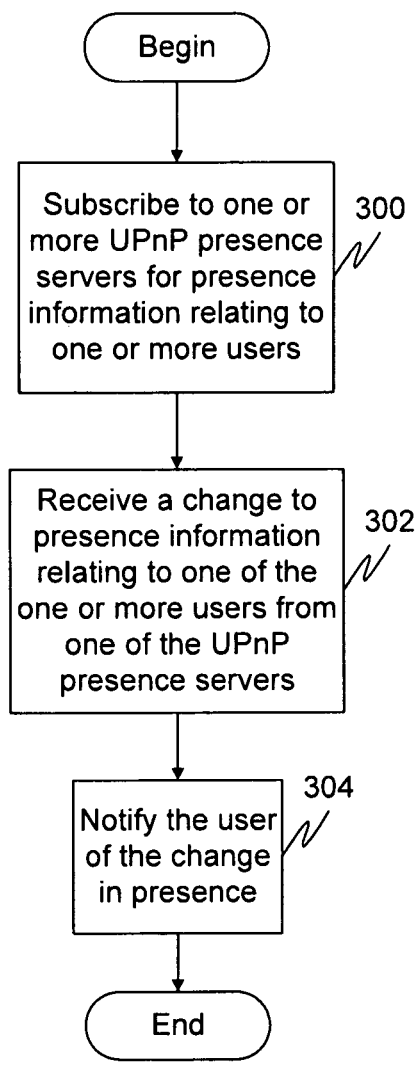
FIG. 3 is a flow diagram illustrating a method for remoting user/callee presence information in a UPnP network in accordance with an embodiment of the present invention.

FIG. 3 is a flow diagram illustrating a method for remoting user/callee presence information in a UPnP network in accordance with an embodiment of the present invention. This diagram depicts the flow undertaken by a UPnP presence client. This diagram also depicts the flow undertaken in a system that does not have, or at least is not using at the moment, a presence aggregation server. At 300, the client subscribes to one or more UPnP presence servers for presence information relating to one or more users. At 302, a change to presence information relating to one of the one or more users is received from one of the UPnP presence servers. At 304, the user of a device associated with the UPnP presence client is notified of the change in presence. It should be noted that throughout this document, the term "user" as it pertains to a device associated with a UPnP presence server shall be defined as a user of services provided by a device that hosts or otherwise interacts with a presence client. The notification may take many forms, depending upon the user interface implemented on the client. For example, the user may be presented with a "buddy list" on the screen of a UPnP enabled television. When a change occurs in the presence of one of the "buddies" on this list, the list may be altered. For example, a buddy who is no longer available may be removed from the list or an icon next to the buddy's name may be changed to indicate the buddy is no longer available. Similarly, if the change reflects the buddy becoming available, the buddy's name may be added from the list or an icon next to the buddy's name may be changed to indicate the buddy is now available.

Figure 4:
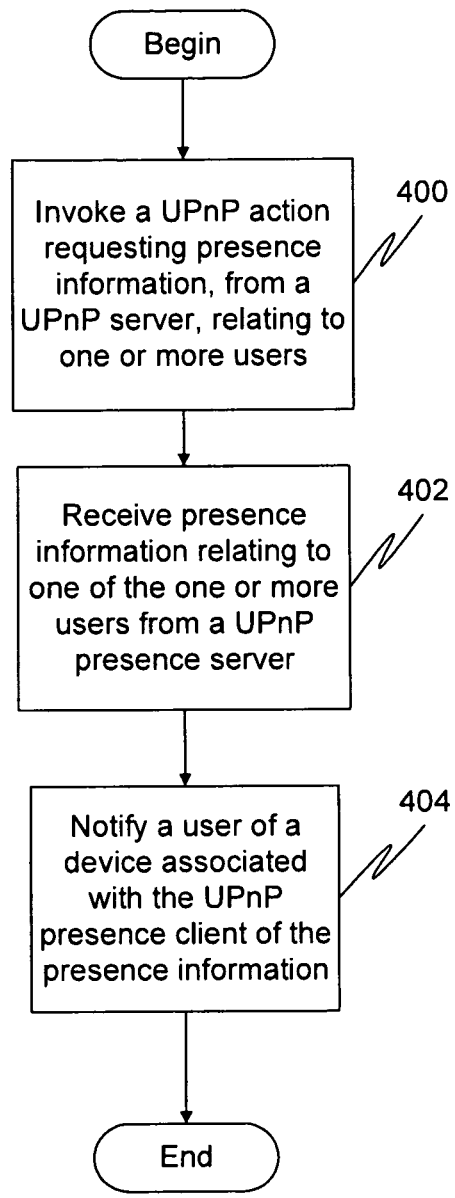
FIG. 4 is a flow diagram illustrating a method for remoting user/callee presence information in a UPnP network in accordance with another embodiment of the present invention.

FIG. 4 is a flow diagram illustrating a method for remoting user/callee presence information in a UPnP network in accordance with another embodiment of the present invention. This diagram also depicts the flow undertaken by a UPnP Presence client. This diagram also depicts the flow undertaken in a system that does not have, or at least is not using at the moment, a presence aggregation server. In this embodiment, however, a UPnP action is invoked rather than using a subscription, thus enabling a user to retrieve presence information on an ad hoc basis and eliminate potentially annoying alerts as to when certain users become available. At 400, the client invokes a UPnP action requesting presence information, from a UPnP presence server, relating to one or more users. At 402, presence information relating to one of the one or more users is received from one of the UPnP presence servers. At 404, the user of a device associated with the UPnP Presence client is notified of the change in presence.

Figure 5:
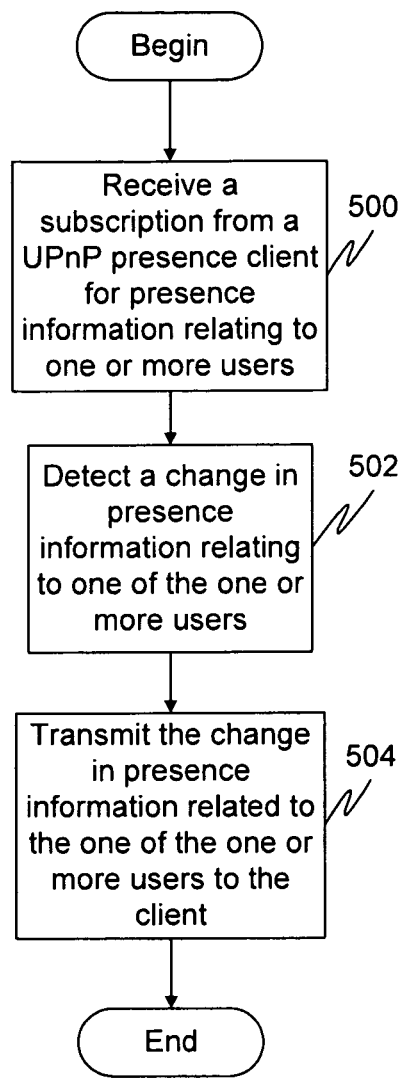
FIG. 5 is a flow diagram illustrating a method for remoting user/callee presence information in a UPnP network in accordance with another embodiment of the present invention.

FIG. 5 is a flow diagram illustrating a method for remoting user/callee presence information in a UPnP network in accordance with another embodiment of the present invention. This diagram depicts the flow undertaken by a UPnP Presence server. This diagram also depicts the flow undertaken in a system that does not have, or at least is not using at the moment, a presence aggregation server. At 500, a subscription is received from a UPnP Presence client for presence information relating to one or more users. At 502, a change in presence information relating to one of the one or more users is detected. At 504, the change in presence information related to the one of the one or more users is transmitted to the client.

Figure 6:
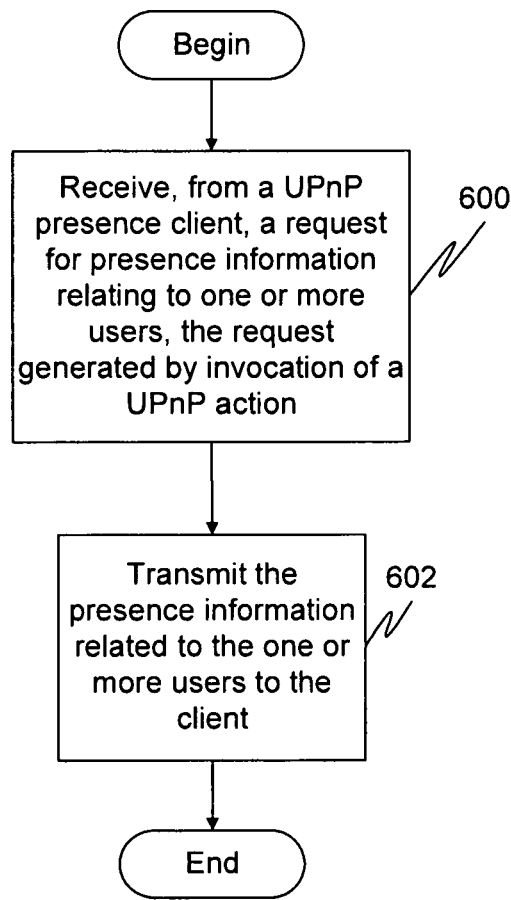
FIG. 6 is a flow diagram illustrating a method for remoting user/callee presence information in a UPnP network in accordance with another embodiment of the present invention.

FIG. 6 is a flow diagram illustrating a method for remoting user/callee presence information in a UPnP network in accordance with another embodiment of the present invention. This diagram depicts the flow undertaken by a UPnP Presence server. This diagram also depicts the flow undertaken in a system that does not have, or at least is not using at the moment, a presence aggregation server. In this embodiment, however, a UPnP action is invoked rather than using a subscription, thus enabling a user to retrieve presence information on an ad hoc basis and eliminate potentially annoying alerts as to when certain users become available. At 600, a request for presence information relating to one or more users is received from a UPnP presence client, the request generated by invocation of a UPnP action. At 602, the presence information related to the one or more users is transmitted to the client.

Figure 7:
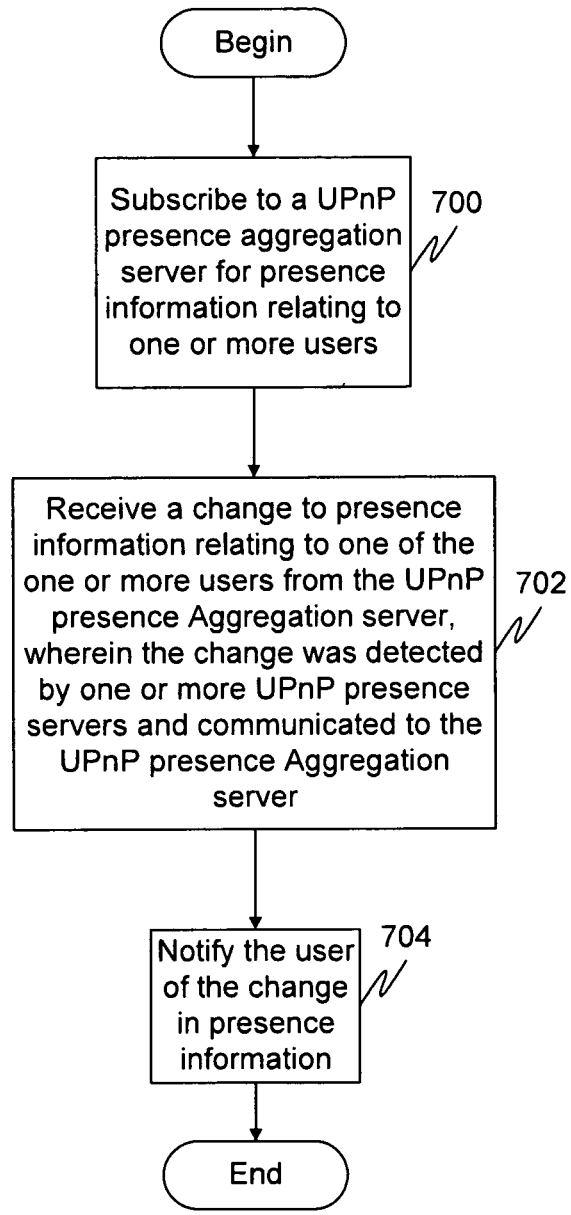
FIG. 7 is a flow diagram illustrating a method for remoting user/callee presence information in a UPnP network in accordance with another embodiment of the present invention.

FIG. 7 is a flow diagram illustrating a method for remoting user/callee presence information in a UPnP network in accordance with another embodiment of the present invention. This diagram depicts the flow undertaken by a UPnP Presence client. This diagram also depicts the flow undertaken in a system that has a UPnP presence aggregation server. At 700, the client subscribes to a UPnP presence aggregation server for presence information relating to one or more users. At 702, a change to presence information relating to one of the one or more users is received from the UPnP presence aggregation server, wherein the change was detected by one or more UPnP presence servers and communicated to the UPnP presence aggregation server. At 704, the user is notified of the change in presence. This notification may take many forms, depending upon the user interface implemented on the client. For example, the user may be presented with a "buddy list" on the screen of a UPnP enabled television. When a change occurs in the presence of one of the "buddies" on this list, the list may be altered. For example, a buddy who is no longer available may be removed from the list or an icon next to the buddy's name may be changed to indicate the buddy is no longer available. Similarly, if the change reflects the buddy becoming available, the buddy's name may be added from the list or an icon next to the buddy's name may be changed to indicate the buddy is now available.

Figure 8:
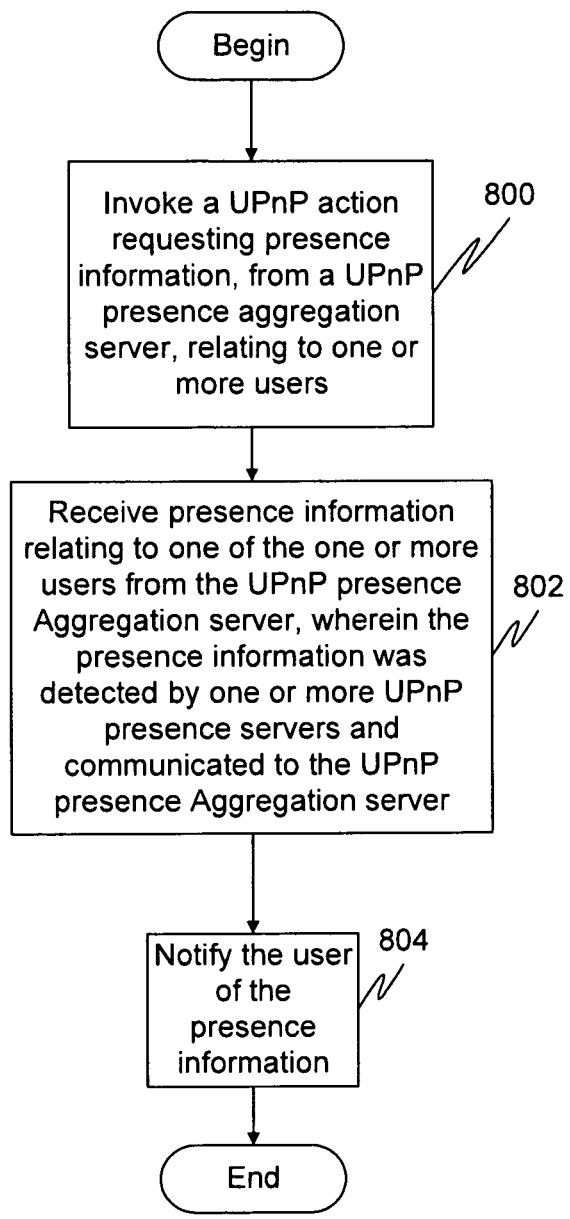
FIG. 8 is a flow diagram illustrating a method for remoting user/callee presence information in a UPnP network in accordance with another embodiment of the present invention.

FIG. 8 is a flow diagram illustrating a method for remoting user/callee presence information in a UPnP network in accordance with another embodiment of the present invention. This diagram depicts the flow undertaken by a UPnP Presence client. This diagram also depicts the flow undertaken in a system that has a UPnP presence aggregation server. In this embodiment, however, a UPnP action is invoked rather than using a subscription, thus enabling a user to retrieve presence information on an ad hoc basis and eliminate potentially annoying alerts as to when certain users become available. At 800, the client invokes a UPnP action requesting presence information, from a UPnP presence aggregation server, relating to one or more users. At 802, presence information relating to one of the one or more users is received from the UPnP presence aggregation server, wherein the presence information was communicated by one or more UPnP presence servers to the UPnP presence aggregation server. At 804, the user of a device associated with the UPnP presence client is notified of the presence information.

Figure 9:
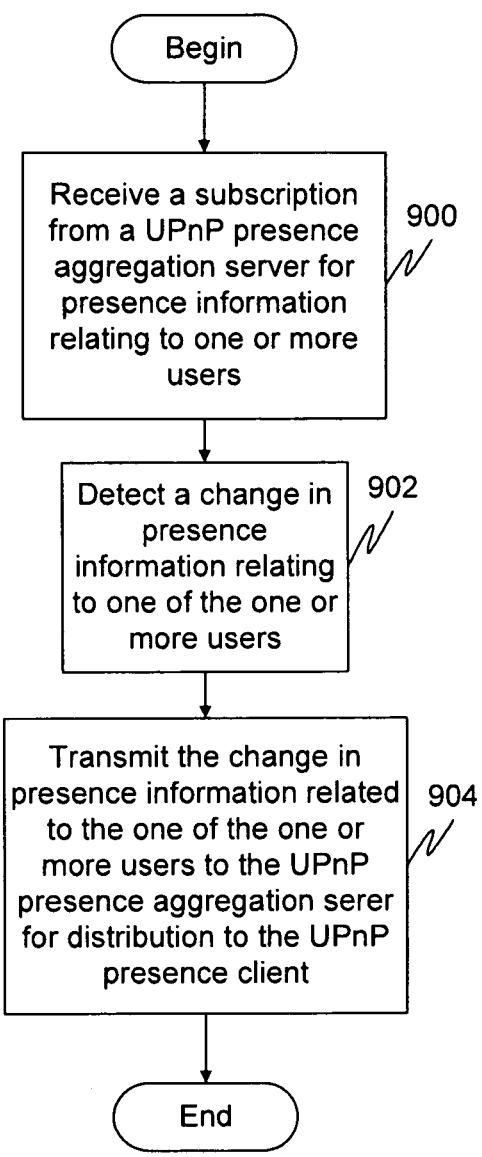
FIG. 9 is a flow diagram illustrating a method for remoting user/callee presence information in a UPnP network in accordance with another embodiment of the present invention.

FIG. 9 is a flow diagram illustrating a method for remoting user/callee presence information in a UPnP network in accordance with another embodiment of the present invention. This diagram depicts the flow undertaken by a UPnP Presence server. This diagram also depicts the flow undertaken in a system that has a presence aggregation server. At 900, a subscription is received from a UPnP Presence Aggregation Server for presence information relating to one or more users. At 902, a change in presence information relating to one of the one or more users is detected. At 904, the change in presence information related to the one of the one or more users is transmitted to UPnP presence aggregation server for distribution to the UPnP presence client.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method for remoting user/callee presence information in a home network, the method comprising:
    subscribing, at the home network presence server, to an IP Multimedia Subsystem (IMS) based system to receive presence information relating to one or more users;
    collecting, at the home network presence server, presence information relating to the one or more users, the presence information indicating whether the one or more users are available to receive a call or message wherein the presence information is collected from the IMS based system;
    receiving, at the home network presence server, a subscription from a home network presence client for presence information relating to the one or more users, wherein the received subscription is made using a Universal Plug and Play (UPnP) protocol;
    receiving a change in presence information from the IMS based system at the home network presence server, the change in presence information relating to the one or more users; and
    notifying the home network presence client of the change in presence information using the UPnP protocol.

2. The method of claim 1, wherein the presence information is information regarding presence of individuals identified in a contact list for a user of a device associated with the home network presence client.

3. The method of claim 1, wherein the home network presence server is on a cell phone.

4. The method of claim 1, wherein the home network presence client is on a television.

5. The method of claim 1, wherein the presence information includes information regarding instant messaging presence.

6. The method of claim 1, wherein the presence information includes information regarding voice call presence.

7. The method of claim 1, wherein the presence information includes geographic location.

8. The method of claim 1, wherein the presence information regarding the one of the one or more users was gathered by a home network presence server from outside networks.

9. The method of claim 8, wherein the outside networks include one or more Simple Interface Protocol (SIP) networks and one or more instant messaging networks.

10. The method of claim 1 further comprising:
    running a UPnP service at the home network presence server, the UPnP service providing a state variable that indicates at least one of a group consisting of an availability of a user, a location of a user and a phone capability of a user; and
    transmitting changes in the state variable to the home network presence client using a UPnP protocol.

11. The method of claim 1 wherein the home network presence client is in a television, further comprising:
    providing a UPnP service with a callback feature;
    providing an interface that allows an action to be invoked that allows a device to register interest in the callback feature on the UPnP service;
    registering, at a UPnP control point, an interest to call a target user;
    registering, at the UPnP control point, the television as a device to receive a call;
    providing status of the target user to the UPnP control point using a UPnP eventing mechanism; and
    after the provided status of the target user indicates that the target user is available, forwarding a call to the television.

12. The method of claim 11 wherein the UPnP control point is in the television.

13. The method of claim 11 wherein the UPnP control point is in a device other than the television.

14. A method for remoting user/callee presence information in a home network, the method comprising:
    displaying on a screen of a television a buddy list indicating one or more users that can receive a phone call or message through the television;
    subscribing, at a home network presence aggregation server, to a home network presence server using a Universal Plug and Play (UPnP) protocol to receive presence information collected by the home network presence server;
    invoking, at a home network presence client of the television, a UPnP action requesting presence information, from the home network presence aggregation server, relating to the one or more users, wherein the home network presence aggregation server receives changes detected by a plurality of different home network presence servers via server-to-server communications;
    receiving, from the home network presence aggregation server, presence information relating to at least one of the one or more users wherein the presence information is received at the home network presence client of the television; and
    altering the buddy list displayed on the screen of the television based on the received presence information to indicate that a status of one of the users has changed.

15. A method for remoting user/callee presence information in a home network, the method comprising:
    receiving, at a home network presence server, a subscription from a home network presence aggregation server for presence information relating to user presence using a Universal Plug and Play (UPnP) protocol, wherein the home network presence aggregation server receives changes detected by a plurality of different home network presence servers via server-to-server communication, and wherein the home network presence aggregation server aggregates each change received;

subscribing, at the home network presence server, to an IP Multimedia Subsystem (IMS) based system to receive presence information relating to user presence;

detecting a change in presence information relating to user presence; and transmitting the change in presence information relating to user presence to the home network presence aggregation server for distribution to a home network presence client.

16. A cell phone comprising:
a memory;
a processor;
a home network presence server configured to:
    subscribe to an IP Multimedia Subsystem (IMS) based system to receive presence information relating to user presence;
    collect presence information relating to user presence, the presence information indicating user availability to receive a call or message, wherein the presence information is collected from the IMS based system;
    receive a subscription from a home network presence client for presence information relating to user presence using Universal Plug and Play (UPnP) protocol;
    detect a change in presence information relating to user presence; and
    transmit the change in presence information relating to user presence to the home network presence client using the UPnP protocol.

17. The method of claim 16 wherein the receiving of the subscription from the home network presence client uses a UPnP protocol.

18. A television comprising:
a memory;
a screen;
a processor; and
a home network presence client configured to:
    help display a buddy list on the screen indicating one or more users that can receive a phone call through the television;
    subscribe to one or more home network presence servers using a UPnP protocol, for presence information relating to one or more users;
    receive, from one of the home network presence servers, a change in presence information relating to one of said one or more users; and
    help alter the buddy list displayed on the screen based on the received change in presence information indicating that a status of one of the users has changed.

19. A method for remoting user/callee presence information in a home network, the method comprising:
subscribing, at a home network presence server on a cell phone, to an IP Multimedia Subsystem (IMS) based system to receive presence information on one or more users;

collecting, at the home network presence server on the cell phone, presence information relating to the one or more users, the presence information indicating whether the one or more users are available to receive a call or message and wherein the presence information is collected from a network outside of a local network that includes the home network presence server;

receiving, at the home network presence server, a subscription from a home network presence client on a television for the presence information relating to the one or more users wherein the received subscription is made using a Universal Plug and Play (UPnP) protocol and wherein the local network also includes the home network presence client;

displaying a buddy list on a screen of the television indicating a list of people that a user of the television can communicate with through the television wherein the buddy list further indicates which of the list of people is available to communicate with the television user wherein the list of people displayed on the screen includes the one or more users for which the presence information is received at the home network presence server;

receiving a change in presence information at the home network presence server relating to the one or more users from the IMS based system; and notifying the home network presence client of the change in presence information using the UPnP protocol; and altering the buddy list on the screen of the television to reflect that availability of one of the listed people has changed, wherein the change in availability is based on the notification received by the home network presence client.

* * * * *